US007355561B1

(12) United States Patent
Clarke et al.

(10) Patent No.: US 7,355,561 B1
(45) Date of Patent: Apr. 8, 2008

(54) SYSTEMS AND METHODS FOR PROVIDING IMAGES

(75) Inventors: Jerry A. Clarke, Abingdon, MD (US); John M. Vines, Conowingo, MD (US); Eric R. Mark, Bel Air, MD (US)

(73) Assignee: United States of America as represented by the Secretary of the Army, Washington, DC (US)

(*) Notice: Subject to any disclaimer, the term of this patent is extended or adjusted under 35 U.S.C. 154(b) by 736 days.

(21) Appl. No.: 10/939,417

(22) Filed: Sep. 14, 2004

Related U.S. Application Data (60) Provisional application No. 60/503,443, filed on Sep. 15, 2003.

(51) Int. Cl.
G06F 15/72 (2006.01)
(52) U.S. Cl. .................. 345/1.1; 345/418; 345/440; 345/501; 345/619; 345/625; 345/635
(58) Field of Classification Search ........... 345/1.1, 345/5, 418, 440, 619, 625, 634, 635, 501
See application file for complete search history.

(56) References Cited

U.S. PATENT DOCUMENTS

| | | | |
|---|---|---|---|
| 5,024,521 A | 6/1991 | Zuchowski et al. | |
| 5,371,854 A | 12/1994 | Kramer | |
| 5,453,686 A | 9/1995 | Anderson | |
| 5,479,603 A * | 12/1995 | Stone et al. | 715/804 |
| 5,533,129 A | 7/1996 | Gefvert | |
| 5,602,922 A | 2/1997 | Lee | |
| 5,666,424 A | 9/1997 | Fosgate et al. | |
| 5,708,718 A | 1/1998 | Ambourn et al. | |
| 5,729,704 A * | 3/1998 | Stone et al. | 715/804 |
| 5,730,140 A | 3/1998 | Fitch | |
| 5,809,150 A | 9/1998 | Eberbach | |
| 5,831,260 A | 11/1998 | Hansen | |
| 5,956,180 A | 9/1999 | Bass et al. | |
| 6,009,394 A | 12/1999 | Bargar et al. | |
| 6,064,521 A | 5/2000 | Burke | |
| 6,118,876 A | 9/2000 | Ruzicka | |
| 6,154,723 A | 11/2000 | Cox et al. | |
| 6,246,067 B1 * | 6/2001 | Tullis | 250/559.3 |
| 6,266,136 B1 | 7/2001 | Ramer et al. | |
| 6,335,765 B1 | 1/2002 | Daly et al. | |
| 6,369,564 B1 | 4/2002 | Khalfin et al. | |
| 6,380,732 B1 | 4/2002 | Gilboa | |
| 6,400,139 B1 | 6/2002 | Khalfin et al. | |

(Continued)

*Primary Examiner*—Bipin Shalwala
*Assistant Examiner*—Vincent E. Kovalick
(74) *Attorney, Agent, or Firm*—William W. Randolph (57) ABSTRACT

Systems and methods for providing images are disclosed. An exemplary embodiment of the system for providing images includes a first image display device for displaying a first image at a first image plane and a second image display device for displaying a second image at a second image plane. The first image plane is in front of the second image plane relative to an audience. The system also includes a real-object tracking system for tracking the position and orientation of a real object positioned between the first image plane and the second image plane and a video sub-system coupled to the first and second image display devices and the real-object tracking system for synchronizing the first image with the second image and the first and second images with the position and orientation of the real object placed between the first and second image planes.

19 Claims, 4 Drawing Sheets

U.S. PATENT DOCUMENTS

| | | |
|---|---|---|
| 6,409,599 B1 | 6/2002 | Sprout et al. |
| 6,409,687 B1 | 6/2002 | Foxlin |
| 6,487,296 B1 | 11/2002 | Allen et al. |
| 6,545,670 B1 | 4/2003 | Pryor |
| 6,624,626 B2 | 9/2003 | Khalfin |
| 6,681,629 B2 | 1/2004 | Foxlin |
| 6,757,068 B2 | 6/2004 | Foxlin |
| 6,762,600 B2 | 7/2004 | Khalfin |

\* cited by examiner

SYSTEMS AND METHODS FOR PROVIDING IMAGES

CROSS-REFERENCE TO RELATED APPLICATIONS

This application claims the benefit of priority of U.S. Provisional Application Ser. No. 60/503,443 entitled Augmented Virtuality Scientific Data Exploration System filed Sep. 15, 2003, the disclosure of which is hereby incorporated by reference.

GOVERNMENT INTEREST

The invention described herein may be manufactured, used, and licensed by or for the United States Government.

BACKGROUND OF THE INVENTION

1. Technical Field

The present invention relates to the field of optical viewing systems and, in particular, to optical viewing systems that simultaneously display images from at least two video sources.

2. Description of the Related Art

Present optical viewing systems, such as those illustrated in U.S. Pat. No. 5,956,180 to Bass et al. (incorporated by reference in its entirety), utilize two viewing screens that each display an image. When viewed, one image appears in front of the other creating a foreground and background effect. This is the result of the observer's ability to perceive depth.

Each eye of an observer perceives an image at a slightly different angle. This parallax enables humans to perceive depth as well as height and width. To simulate depth in a two-dimensional image, the image can be composed of two images slightly offset from each other. By polarizing each of the two images and wearing special glasses, commonly called 3-D glasses, the two images appear to be merged together but now provide the perception of depth. The left eye receives one of the images, the image polarized to correspond to the left lens of the glasses. The right eye receives the other image, the image polarized to correspond to the right lens of the glasses. These images, commonly called stereographic images, thus create the illusion of depth in the image.

Stereographic images can be quite useful with virtual reality systems. Computer-generated images that are commonly two-dimensional can thus include the effect of depth, which makes the images more real, or life-like. Virtual reality systems have a wide variety of uses, such as video gaming and computer simulators.

A number of technologies exist for tracking the position and orientation of an object, such as, U.S. Pat. Nos. 5,453,686, 6,369,564, 6,400,139, 6,624,626 and 6,762,600 assigned to Polhemus Incorporated; U.S. Pat. Nos. 6,681,629 and 6,757,068 assigned to Intersense Incorporated; U.S. Pat. No. 5,831,260 assigned to Ascension Technology Corporation; U.S. Pat. No. 6,266,136 assigned to Advanced Optical Technologies; and U.S. Pat. No. 6,380,732 assigned to Super Dimension Ltd, the teachings of which are incorporated herein by reference.

SUMMARY

Systems and methods for providing images are disclosed. A first embodiment of such a system includes: a first stereographic-image projection device for projecting a first polarized image on a first screen at a first distance from an observer and a second stereographic-image projection device for projecting a second polarized image on a second screen at a second distance from an observer. The second screen is substantially transparent such that the first image is viewable through the second screen. The system also includes a real-object tracking system for tracking the three-dimensional position and orientation of a real object placed between the first and second screens and a video sub-system coupled to the first and second stereographic-image projection devices for synchronizing the first image with the second image. The video sub-system is also coupled with the real-object tracking system such that the first image and the second image are synchronized with the position and orientation of the real object placed between the first and second screens. The system also includes an audio sub-system coupled to the video sub-system. The audio sub-system includes a sonification system generating a virtual sound field synchronized with the first and second images, a surround-sound speaker system for outputting at least a portion of the virtual sound field, and a low-frequency sound transducer positioned to provide a physical vibration sensation for the audience.

Another exemplary embodiment includes a first image display device for displaying a first image at a first image plane and a second image display device for displaying a second image at a second image plane. The first image plane is in front of the second image plane relative to an audience. The system also includes a real-object tracking system for tracking the position and orientation of a real object positioned between the first image plane and the second image plane and a video sub-system coupled to the first and second image display devices and the real-object tracking system for synchronizing the first image with the second image and the first and second images with the position and orientation of the real object placed between the first and second image planes.

An embodiment of a method for providing images comprises: generating a first image to be viewed from a first distance by an observer; generating a second image to be viewed from a second distance by the observer; synchronizing the first image with the second image; receiving information regarding the position and orientation of a real-object; and adjusting the first image and the second image as a function of the position and orientation of the real object.

Other devices, systems, methods, features and/or advantages will be or may become apparent to one with skill in the art upon examination of the following drawings and detailed description. It is intended that all such additional devices, systems, methods, features and/or advantages be included within this description.

BRIEF DESCRIPTION OF THE DRAWINGS

Many aspects of the disclosure can be better understood with reference to the following drawings. Note, the components in the drawings are not necessarily to scale. Also, like reference numerals designate corresponding parts throughout the several views.

DETAILED DESCRIPTION

Described in detail here are systems and methods for providing images. An exemplary system can be used for scientific exploration applications, while others can be used for other applications, such as entertainment applications. In particular, the systems and methods described herein make use of various technologies, such as stereographic imaging, real-object tracking, and sonification.

Figure 1:
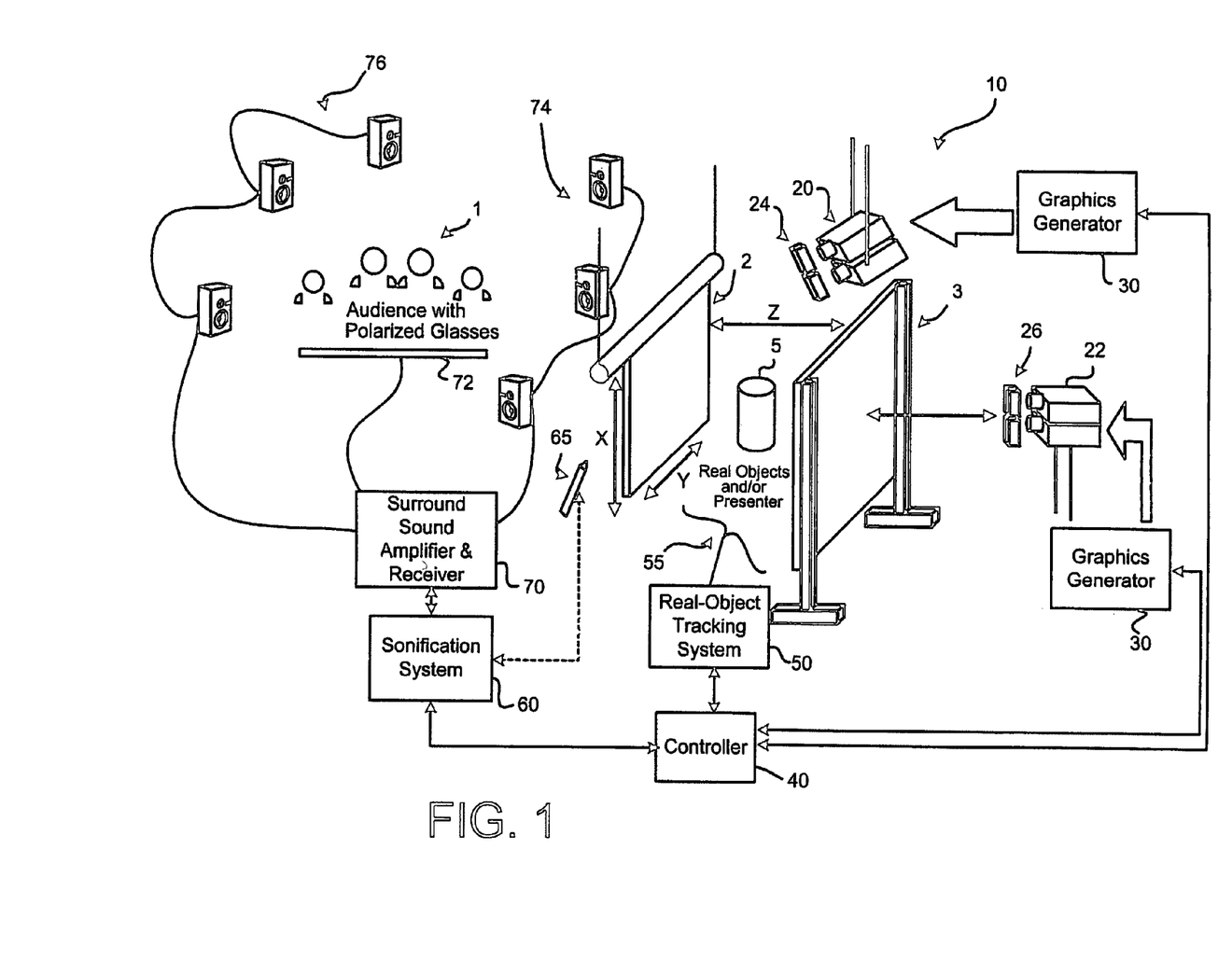
FIG. 1 is a diagram illustrating an embodiment of an augmented virtual reality system.

Turning now to FIG. 1, illustrated is a first embodiment of an augmented virtual reality system 10. A background screen 3 is positioned a first distance from an audience 1 and a foreground screen 2 is positioned a second distance from the audience 1. The foreground screen 2 is positioned a distance Z in front of the background screen 3. Although this embodiment uses two screens, more than two screens could be utilized in other embodiments. For instance, a middle-ground screen could be positioned between the background screen and foreground screen.

The background screen 3 is preferably a rear-projection, polarization-preserving screen comprised of anti-hotspotting material. Preferably, the background screen 3 supports viewing cone angles of up to 180 degrees with light gain response of 1.0, where the measurement calibration is magnesium carbonate. The background screen 3 is suspended from a ceiling or mounted on a stand, for example. In other embodiments, the background screen 3 may be a picture tube, or some other picture display.

As FIG. 1 illustrates, the preferred embodiment utilizes screens upon which an image is projected. This is not necessary however for the background screen 3. Any display device could be used, so long as the appropriate image can be viewed by the audience 1.

The foreground screen 2 is preferably composed of a polarization-preserving transparent material. The rear projected image, as well as the environment behind the screen 2, should be clearly visible. Accordingly, the image to be projected on the background screen 3 is viewed through the foreground screen 2. The foreground screen 2 is suspended from the ceiling, and an image projected thereupon. In other embodiments, the foreground screen 2 may be a transparent liquid crystal display (LCD) similar to that illustrated in U.S. Pat. No. 5,956,180.

A real object 5 is positioned between the foreground screen 2 and background screen 3. The real object 5 may be a presenter, an inanimate object, or a collection of objects. Examples of the real object 5 include a vehicle or ammunition round, or possibly a scaled model of such objects. The real object 5 is viewable by the audience 1 through the transparent foreground screen 2.

A first image display device 22 projects a first image (in this case, a background image) onto the background screen 3. In this embodiment, the first image display device 22 projects the image from the rear of the screen 3. In other embodiments, the first image display device 22 could front-project the background image onto an appropriate screen.

A second image display device 20 rear-projects a second image (in this case, a foreground image) onto the foreground screen 2. Similar to the first image display device 22, the second image display device 20 may instead front-project the foreground image. Alternatively, the second image display device 20 may include an integrated foreground screen. For example, a transparent LCD could be utilized so that an image may appear on the LCD screen and the audience 1 could also see through the LCD screen to view the background image.

The type of display devices will largely dictate the scale of the system 10. The only constraint with the second image display device 20 and screen 2 is that an audience 1 be capable of seeing the background image and real object 5 through the foreground image.

In the preferred embodiment, stereographic images are displayed. Accordingly, stereographic image display devices are used for the first and second image display devices 22 and 20. Stereographic image display devices generally are each composed of two display devices that display a similar image at slightly different angles. Polarizing film 24 and 26 serve to distinguish the two images. When the audience member uses polarized glasses, each eye of the member receives one of the two images. In this manner, depth is added to the image. Those skilled in the art will appreciate the nature in which stereographic images are produced and displayed.

Illustrated in FIG. 1 is the preferred embodiment, in which stereographic images are projected onto screens. A controller 40 is coupled to a graphics generator 30 which is coupled to the first and second image display devices 22 and 20. The controller 40 serves to house the software, hardware, and firmware that runs the system 10. In the broad sense, the controller 40 may be considered the central processing unit (CPU) of the system 10. The controller 40 will be discussed in further detail in FIG. 2.

The graphics generator 30 receives information from the controller 40 and renders an appropriate image to be displayed. In some embodiments, the images may be motion picture images, in which case the graphics generator 30 may, depending upon hardware configurations and capabilities, composite computer graphics data onto the motion picture images. The motion picture capture equipment should support progressive scan formats at standard and high definition resolutions. In other embodiments, the images will be virtual renderings of a particular object or function. In this case the graphics generator 30 serves to synchronize computer graphics signals.

The graphics generator 30 can divide a given three-dimensional image into two three-dimensional images, one for the foreground and one for the background, relative to the real object 5. In this manner, a fully three-dimensional image "wrapped" around the real object 5 can be displayed. Furthermore, the graphics generator 30 may be capable of creating stereographic images from a provided two-dimensional image. The stereographic images translate the two-dimensional images actually displayed into three-dimensional images (as now depth perception is added to the images). The portion of the three-dimensional images to be displayed in the foreground and the portion of the three-dimensional images to be displayed in the background may depend on the location of the real object 5 about the Z-axis.

A real-object tracking system 50 is coupled to the controller 40 to translate the position and orientation of the real object 5 as well as any change in the position and orientation of the real object 5 during display. A tracking transmitter 55 is coupled to the real-object tracking system 50, which includes a receiver. The connection may be wired or wireless.

The real-object tracking system 50 provides the controller 40 with the position of the real object 5 in all three axes, as well as the orientation of the real object 5. This information is processed by the controller 40 and provided to the graphics generator 30 which accounts for the position of the real object in the rendering of the images. For example, as the real object 5 is rotated about the Z-axis, so too can the images. In this manner the images will be displayed such that they appear to the audience 1 that they are synchronized with the movement of the real object 5. The position of the real object 5 about the X-axis and Y-axis can easily be accounted for in the images by simply shifting the images in a particular direction. The movement of the real object 5 about the Z-axis can be accounted for in the images by changing the ratio of the foreground and background images, as well as varying the stereographic nature of the images.

The information provided by the real-object tracking system 50 may also be utilized by the controller 40 to vary the actual function that is to be rendered and displayed. For example, the electromagnetic radiation patterns between two real objects may be the subject of the system 10. In this case, the position and orientation of each real object relative to each other, as well as to the screens is necessary. The position and orientation of the objects relative to each other can change the actual function, in this case the radiation patterns, to be displayed and rendered. The real-object tracking system 50 can obtain this information.

Audio provides for a second sensory experience for the audience 1. A sonification system 60 may be coupled to the controller 40 to translate the function to be displayed into an audio signal. Sonification is a technology that translates a function into sound as set forth, for example, in U.S. Pat. Nos. 5,371,854, 5,730,140, 6,009,394, and 6,154,723, herein incorporated by reference.

The sonification system 60 is coupled to a surround sound amplifier & receiver (SSAR) 70 for generating a two- or three-dimensional sound field. A surround sound speaker system 74 and 76 is coupled to the SSAR 70 to output the audio signals. Dolby 5.1 surround sound provides six audio channels (Dolby 6.1 includes seven channels) that combine to produce a two-dimensional surround sound experience. Dolby 10.2 surround sound is a 12 channel system that combined provides for a three-dimensional sound experience. The surround sound speaker system 74 and 76 includes front speakers 74 and rear speakers 76. The number of channels in the front and rear will vary with the audio protocol utilized. Aspects of sound systems, such as a surround sound, are generally discussed in U.S. Pat. Nos. 5,533,129; 5,602,922; 5,666,424; 5,708,718; 5,809,150; 6,118,876; and 6,487,296, herein incorporated by reference.

A transducer 72 may be provided and coupled to the SSAR 70 to produce physical vibrations based upon the low-frequency signals of the surround sound signal. The transducer 72 may be integrated with the flooring system of the audience chamber.

In practice, the sonification system 60 receives a multi-dimensional function provided by the controller 50 and translates the function into a multi-dimensional sound field. The dimensions do not have to match. In other words, a three-dimensional function may be projected into a two-dimensional sound field. The sonification system 60 working with the SSAR 70 can adjust the amplitude of various channels to create a multi-dimensional audio environment, and can adjust the frequency to translate a value at a point location or plane location in the multi-dimensional function (the multi-dimensional function can be displayed in the multi-dimensions by the devices described above).

The information provided by the real-object tracking system 50 may also be used by the sonification system 60 so that the multi-dimensional sound field continues to match the multi-dimensional function as it changes based upon the position and orientation of the real object(s) 5.

A sound probe 65 serves to bridge the audio components of the system 10 with the video components of the system 10. The sound probe 65 may be a physical probe used to map a location in real space or may be a virtual probe integrated with the visual images. Regardless, the sound probe 65 provides a means by which a user can explore a multi-dimensional function. A point along the multi-dimensional function generated and visually displayed is determined by the location of the sound probe 65. The function's value at this instance in space and time is provided to the sonification system 60, processed, and output to the SSAR 70. The sound probe 65 provides a coordinate point source, from which an entire plane or planes may be interpolated. Alternatively, a virtual probe integrated in with the video components may include a cursor located within the images. In this case, a user interface with the video sub-system would be necessary to navigate the cursor about the image.

The system 10 includes many components where combined together produce a multimedia augmented virtual reality system. The tracking system 50 and the sound probe 65 provide interactive technology that make the system 10 excellent for learning and/or entertainment applications. Not every component is necessary for each embodiment of the invention. For instance, some embodiments do not include audio system. Other embodiments may include an audio system but do not include a real-object tracking system 50. The audio system could be configured in a number of ways as well. Many different surround sound protocols could be incorporated. The low-frequency signals may be output by a sub-woofer as opposed to or in conjunction with a transducer.

In operation, an audience 1 is positioned in front of the two screens 2 and 3. The range in scale of the system 10 provides for an audience of one person up to an audience of a group of people. To appreciate the stereographic nature of the images, an audience member must wear polarized glasses.

The real object 5 is viewable through the foreground screen 2. When operated, the system 10 produces a three-dimensional image that appears to be wrapped around the real object 5. The real object 5 can move and the image will change with the movement of the real object. This is accomplished by the real-object tracking system 50.

An audience member, or a moderator, can explore the image via the sound probe 65. A point along the function to which the image is created can be located by the sound probe 65, mapped to the virtual sound field by the sonification system 60, and output through the surround sound system.

Figure 2:
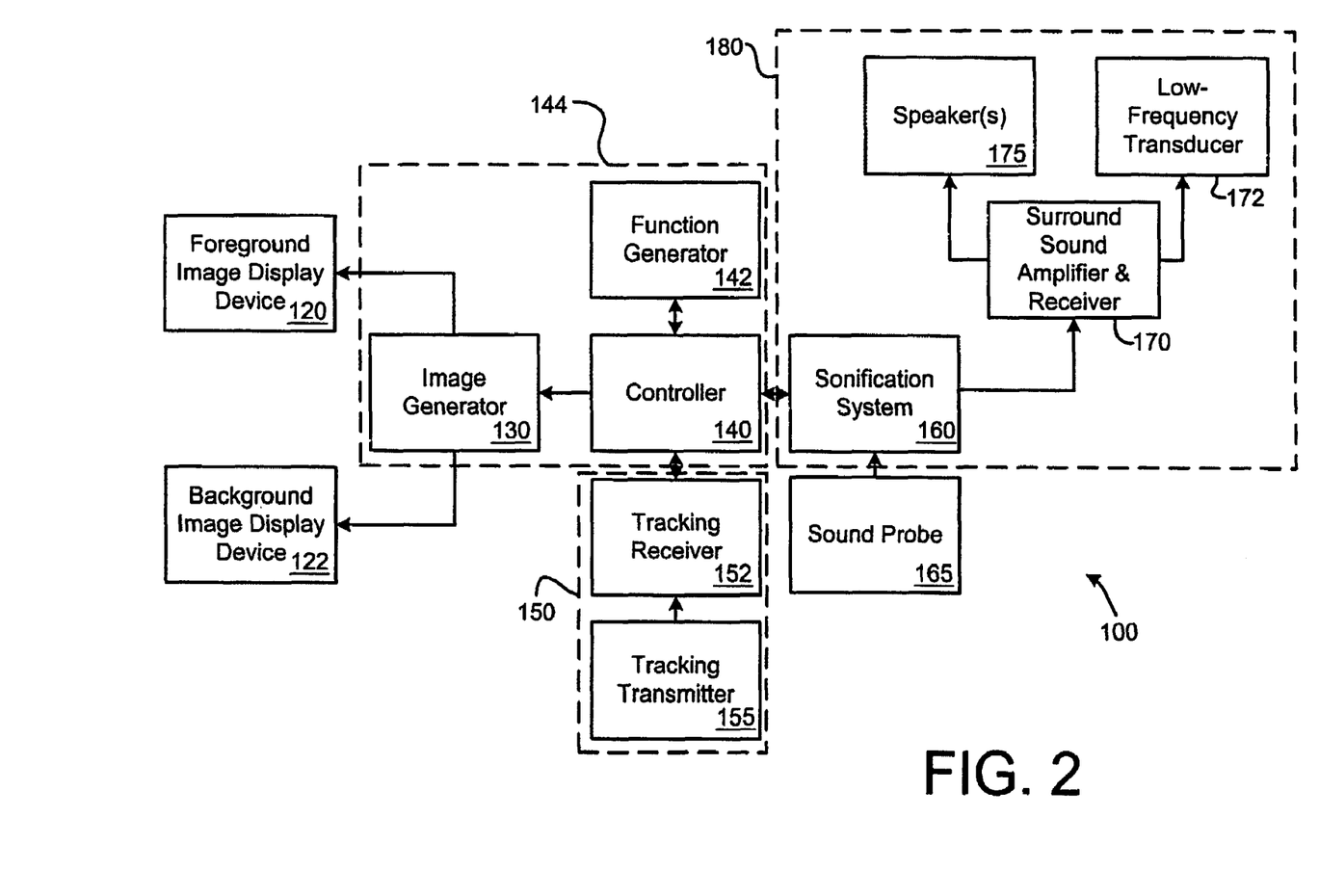
FIG. 2 is a block diagram illustrating another embodiment.

FIG. 2 is a block diagram illustrating a simplified embodiment of an augmented virtual reality system 100. The system 100 is a composed of a video sub-system 144 and an audio sub-system 180. A controller 140 of the video sub-system 144 is coupled to a sonification system 160 of the audio-sub-system 180, which together synchronize an audio output with a video output. A real-object tracking system 150 is coupled to the video sub-system 144 for tracking the position and orientation of a real object positioned between two viewing planes.

The video sub-system 144 generally includes a controller 140 coupled to a function generator 142 and an image or graphics generator 130. Coupled to the image generator 130 is a foreground image display device 120 and a background image display device 122. In some embodiments the display devices 120 and 122 will be integrated with the image generator 130. In other embodiments, these components will be separate.

The audio sub-system 180 includes the sonification system 160 which receives a multi-dimensional function from the controller 140. A surround sound amplifier & receiver (SSAR) 170 is coupled to the sonification system 160. Together the SSAR 170 and sonification system 160 can translate a multi-dimensional function into a multi-dimensional sound field. Coupled to the SSAR 170 are speakers 175 for outputting the audio signal. A low-frequency transducer 172 may be included in the audio sub-system 180 for translating the low-frequency audio signals into physical vibrations or movements.

A sound probe 165 is coupled to the sonification system 160 for providing interactivity and exploration of the multi-dimensional function. The sound probe 165 is illustrated as a distinct component of the system 100. In some embodiments the sound probe 165 will be a physical probe that can determine a position in real space relative to one of the viewing planes and/or to the real object. In these embodiments, the sound probe 165 may be connected directly with the sonification system 160, or alternatively to the controller 140. In other embodiments, the sound probe 165 may be a virtual sound probe integrated within the video sub-system 144. In this case, the probe 165 may appear as a cursor in the generated image and can be controlled by a user interface device, such as a joystick, keyboard, or mouse.

The real-object tracking system 150 generally includes a tracking transmitter 155 and tracking receiver 152. The tracking receiver 152 communicates with the controller 140 of the video sub-system 144. In the preferred embodiment, the real-object tracking system 150 is an external component of the system 100. An interface is provided between the receiver 152 and controller 140. In other embodiments, the real-object tracking system 150 may be fully integrated in with the hardware and software of the video sub-system 144. Generally, the tracking transmitter 155 is a device or devices that is configured to record movements of the real object. As discussed above, various tracking systems are known in the art that utilize various technologies to track an object. The transmitter 155 can communicate with the receiver 152 either through a wired or wireless interface.

The video sub-system 144 is responsible for translating a multi-dimensional function into a visual image. The function generator 144 includes the software, hardware, and firmware to create a multi-dimensional function 142. Various software applications are available for generating multi-dimensional functions. The function generator 142 may work with a user interface to produce the multi-dimensional function. The function generator 142 may also be integrated with the controller 140. In other words, the function generator 142 need not be a separate discrete component of the video sub-system 144. In either case, the function generator 142 can create a multi-dimensional function and forward pertinent data about the function along to the controller 140.

The controller 140 can in turn process this information along with information about the position and orientation of the real object to synchronize the multi-dimensional function with the real object. The controller 140 includes the software, hardware, and firmware to model the multi-dimensional function to be generated and properly displayed by the image display devices 120 and 122. This requires the controller 140 to have knowledge of the dimensions of the system 100, in particular, the dimensions of the viewing screens, the dimensions of the real object (which may be provided by the real-object tracking system 150), and the distance between the viewing screens. With this information, the controller 140 can scale the multi-dimensional function to the dimensions of the viewing screen and viewing area.

The controller 140 also includes the hardware, software, and firmware for digital signal processing the multi-dimensional function. The controller 140 can receive information from the real-object tracking system 150 and properly adjust the function accordingly. The controller 140 may work to create a coordinate space in which the multi-dimensional function can be mapped.

The controller 140 can also receive coordinate information from the sound probe 165, either directly or via the sonification system 160, and map the coordinate information to the multi-dimensional function. The controller 140 can provide the coordinate information to the image generator 130 so as to generate a visual cursor. The controller 140 can also produce a function value(s) of the multi-dimensional function at the given coordinate location. The function value(s) can be provided to the sonification system 160 to generate an audio output signal based upon the function value. This process could also be performed directly by the sonification system 160 without the help of the controller 140.

The video sub-system 144 may include a computer or collection of computers and/or other hardware specially configured with software and/or firmware to perform the above-described tasks.

Likewise, the audio sub-system 180 may include a computer or collection of computers and/or other hardware specially configured with software and/or firmware to perform the above-described tasks. The audio sub-system 180, as mentioned above, also includes the hardware to receive a signal and generate a surround sound signal.

In the discussion that follows, flow charts are utilized to illustrate method embodiments of the present invention. It should be noted that these method embodiments can be implemented in software, hardware, or a combination thereof. Steps of the disclosed methods can thus be stored and operated from any computer-readable medium for use by or in connection with a computer-readable system or method. In the context of this document, a computer-readable medium is an electronic, magnetic, optical, or other physical device or means that can contain or store a computer program for use by or in connection with a computer-related system or method.

Figure 3:
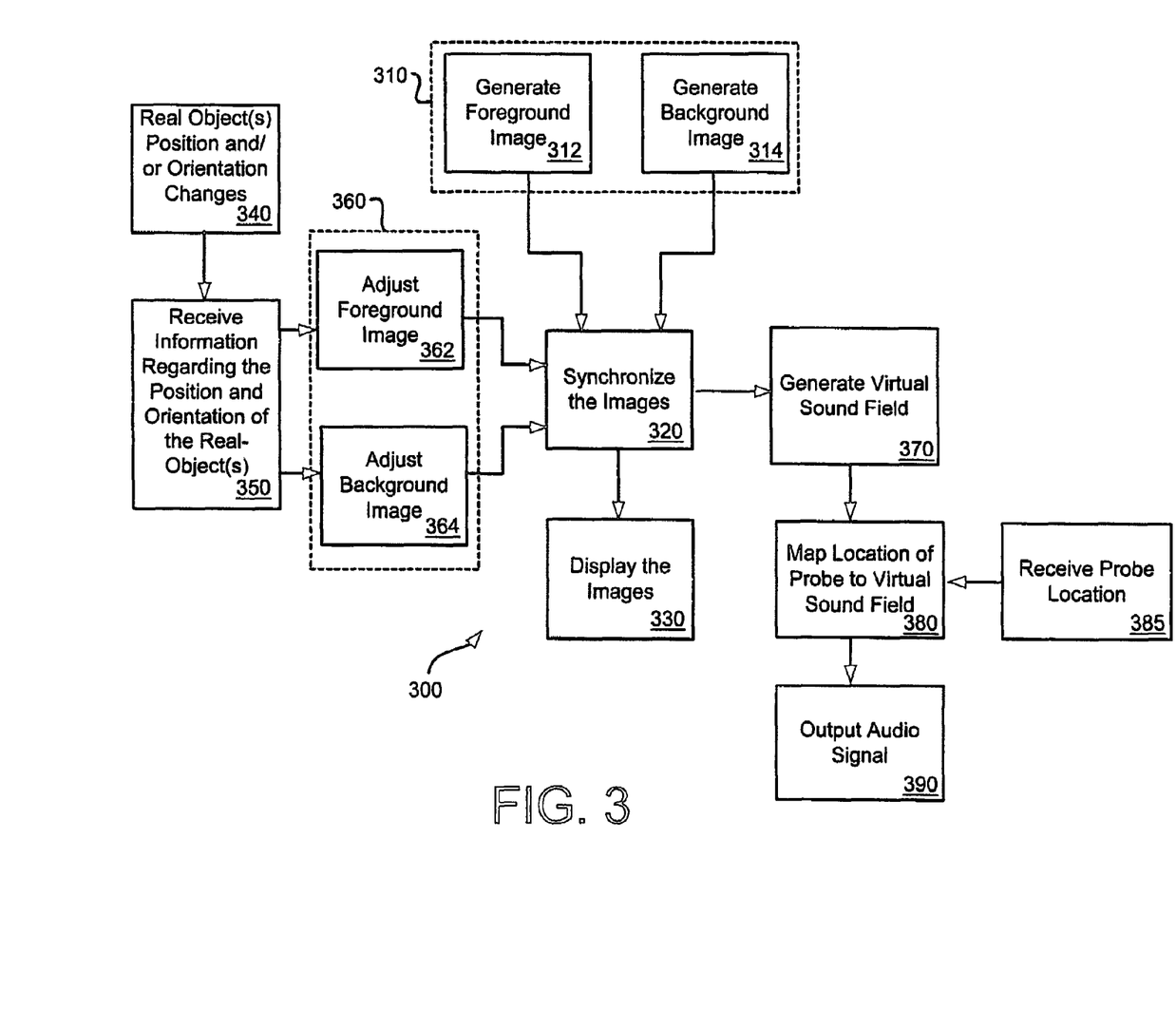
FIG. 3 is a flow chart illustrating an embodiment of a method performed by the augmented virtual reality system of FIG. 1.

FIG. 3 is a flow chart illustrating a method 300 as performed by the augmented virtual reality systems 10 and 100 of FIGS. 1 and 2. It should be noted that the layout of the flow chart illustrated in FIG. 3 is not necessarily representative of an order or progression of steps in the method 300. In actuality, various steps may occur concurrently or out of order from that suggested by the layout in FIG. 3. A person of ordinary skill in the art should appreciate the flexibility in the order of steps in method 300 and not limit the invention to any particular order.

The method 300 begins with generating the images to be displayed in the background and foreground (step 310). This may be performed by receiving a multi-dimensional function generated by a function generator, or simply by receiving video signals to be displayed. Generating the images also includes generating the stereographic images of the original image. The stereographic image data may be provided in a video signal, or may be generated upon generating an image from a multi-dimensional function.

The images generally use the real object(s) as a reference point, thus knowledge of the real object is important when generating the images. Initially, information regarding the position and orientation of the real object, and perhaps shape of the real object, can be received (step 350) and used to adjust, scale, and center the background and foreground images (step 360).

Once the images are initially created, the adjustment of the images may occur in a feedback approach. In other words, the images are generated and then continually adjusted to account for changes in the position and orientation of the real object(s) (step 340).

The generated background and foreground images are synchronized for display (step 320). This may require synchronizing the adjustment of the images in time as well. For video signals, the synchronization of the images may be done beforehand. At this stage in the method 300, the data for rendering the images is prepared and updated with respect to the position and orientation of the real object(s) and ready for display.

The images are then rendered and displayed by background and foreground image display devices (step 330). Adjusting the images with respect to movement of the real object must be done fast enough that there is no significant delay perceived by the viewer, the goal being to create an augmented virtual reality system operating in real time.

A virtual sound field is generated which is synchronized with the images generated based upon a multi-dimensional function (step 370). The virtual sound field may be similarly multi-dimensional. Thus, a three-dimensional function may be the basis for a three-dimensional image and a three-dimensional sound field. In other embodiments, the three-dimensional function may be mapped to a one- or two-dimensional sound field. The sound field includes sound signals of varying frequency and amplitude dependent upon the multi-dimensional function. The signals can also be mapped into a multi-dimensional coordinate space.

Having created a virtual sound field, a location within the field can thus be identified by receiving a probe location (step 385). The probe location relative to the multi-dimensional coordinate space defined in the system can be mapped to a particular location in the multi-dimensional virtual sound field (step 380). The audio signal at this point in the multi-dimensional sound signal can be provided to a surround sound receiver and output accordingly (step 390).

The sound probe may be mapped to a distinct point source, in which case the audio signal(s) correlating to the value at that point source in the multi-dimensional function would be output. Alternatively, the sound probe may be mapped to a given plane or region of the multi-dimensional virtual sound field. In this case, the audio signal output would be a collection of the various values located in that plane or region.

As one can see, the method 300 provides for a multi-sensory experience. A low-frequency transducer can be incorporated to create the sensation of physical vibrations.

Figure 4:
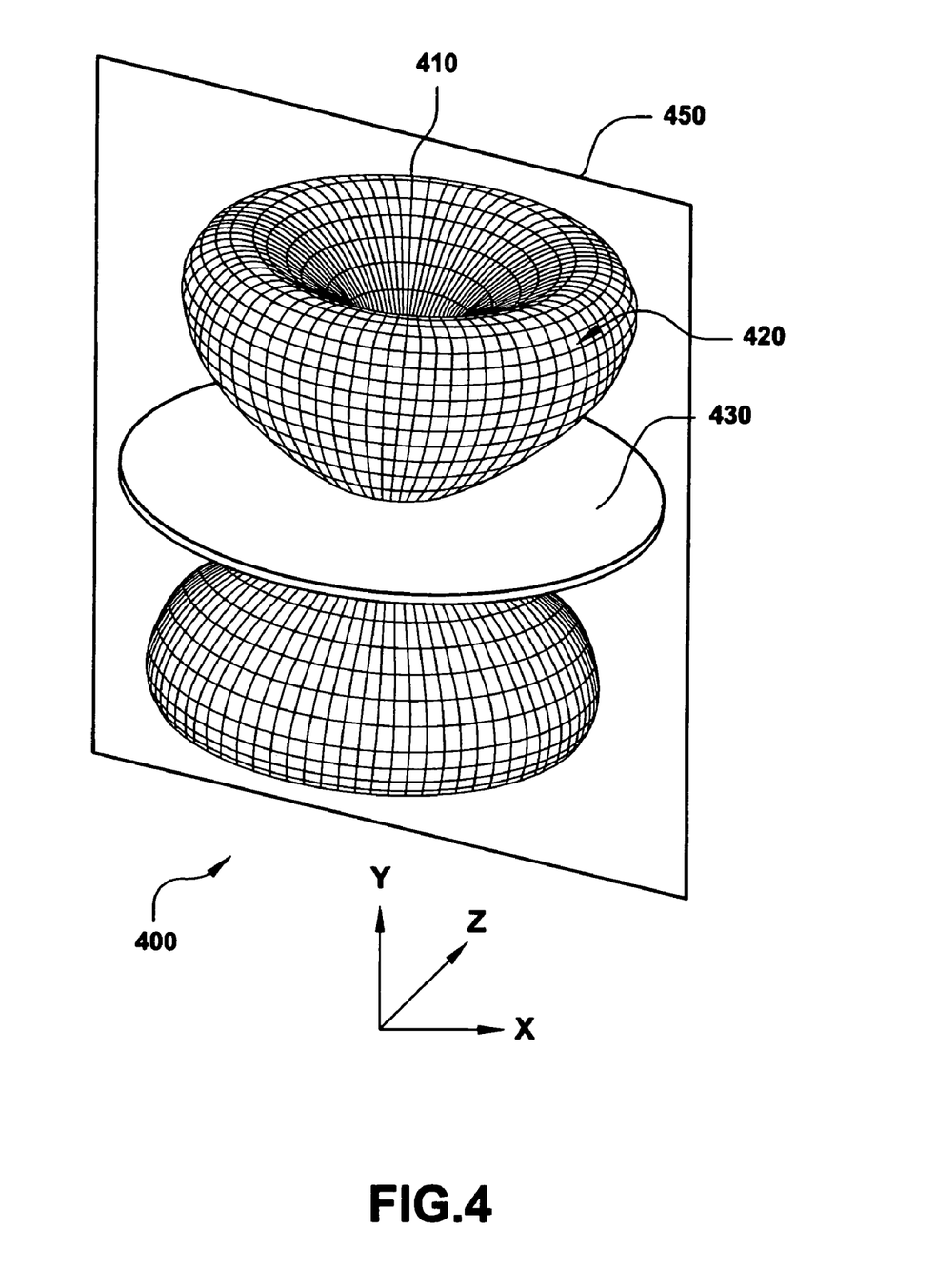
FIG. 4 illustrates a two-dimensional rendering of a three-dimensional image that may be produced by embodiments of the augmented virtual reality system.

FIG. 4 is a two-dimensional portrayal of a three-dimensional image 400 that can be generated and displayed by the systems 10 and 100 of FIGS. 1 and 2. Image 400 can be broken down into a foreground image 420 and a background image 410. Plane 450 serves to visually separate the two images. Real object 430 is embedded between the foreground image 420 and background image 410.

In practice the foreground image 420 and background image 410 would be displayed stereographically, thus creating the perception of depth. The background image 410 would be displayed at a first distance from an audience. The real object 430 would be positioned in front of the background image screen. The foreground image 420 would be displayed on a foreground screen a second distance from the audience, the foreground screen being positioned in front of the real object.

Thus, one continuous graphical image appears to be displayed about the real object 430. The function of the multi-dimensional image can be used to map a multi-dimensional sound field. The plane 450 may be a visual representation of the position of a sound probe, in this case projected across the Y-dimension. The plane 450 can be moved forward or backward in the Z-direction by moving the sound probe. Likewise, the plane could be switched to the Z- or X-planes. The values of the image along the plane 450 can be provided to a sonification system for output.

The real object 430 can be moved in the X, Y, and Z direction, and the real-object tracking system can monitor for this movement and move the image 400 accordingly. Also, the orientation of the real object 430 may change and can be monitored by the real-object tracking system. The image 400 can be adjusted to account for the change in orientation.

It should be emphasized that many variations and modifications may be made to the above-described embodiments. For example, a simple stereo sound system could be used in place of the surround-sound system without departing from the scope of the present invention. All such modifications and variations are intended to be included herein within the scope of this disclosure and protected by the following claims.

What is claimed is:

1. A system for providing images using a first screen and a second screen, the system comprising:

a first stereographic-image projection device for projecting a first polarized image on a first screen at a first distance from an observer;

a second stereographic-image projection device for projecting a second polarized image on a second screen at a second distance from an observer, wherein the second screen is substantially transparent such that the first image is viewable through the second screen;

a real-object tracking system for tracking the three-dimensional position and orientation of a real object placed between the first and second screens;

a video sub-system coupled to the first and second stereographic-image projection devices for synchronizing the first image with the second image, the video sub-system being further coupled with the real-object tracking system such that the first image and the second image are synchronized with the position and orientation of the real object placed between the first and second screens; and an audio sub-system coupled to the video sub-system, the audio sub-system comprising:

a sonification system generating a virtual sound field synchronized with the first and second images;

a surround-sound speaker system for outputting at least a portion of the virtual sound field; and a low-frequency sound transducer positioned to provide a physical vibration sensation for the audience.

2. A system for providing images, comprising:

a first image display device for displaying a first image at a first image plane;

a second image display device for displaying a second image at a second image plane, wherein the first image plane is in front of the second image plane relative to an audience;

a real-object tracking system for tracking the position and orientation of a real object positioned between the first image plane and the second image plane; and a video sub-system coupled to the first and second image display devices and the real-object tracking system for synchronizing the first image with the second image and the first and second images with the position and orientation of the real object placed between the first and second image planes.

3. The system of claim 2, wherein the first image display device is a stereographic image projection device that projects a first polarized image.

4. The system of claim 3, further comprising a transparent, polarization preserving screen onto which to project the first polarized image.

5. The system of claim 2, wherein the second image display device is a stereographic image projection device that projects a second polarized image.

6. The system of claim 2, further comprising:

an audio sub-system coupled to and synchronized with the video sub-system.

7. The system of claim 6, wherein the audio sub-system comprises:

a sonification system generating a virtual sound field synchronized with the first and second images; and a surround-sound speaker system for outputting at least a portion of the virtual sound field.

8. The system of claim 7, wherein the audio sub-system further comprises:

a low-frequency sound transducer positioned to provide a physical vibration sensation for the audience.

9. The system of claim 7, wherein the sonification system comprises:

logic configured to create a virtual sound field in at least one dimension, whereby the sound field is synchronized with at least one of the first and second images;

a probe for providing a location indication in the at least one dimension; and logic configured to output an audio signal based upon the location provided by the probe relative to the virtual sound field.

10. The system of claim 9, wherein the probe is a virtual probe integrated with the video sub-system.

11. The system of claim 9, wherein the probe is a real probe capable of providing a location indication in three dimensions.

12. The system of claim 9, wherein the sound system is a surround sound system that receives the audio signal output from the sonification system and projects the sound signal in an at least two-dimensional sound field.

13. The system of claim 2, wherein the real-object tracking system is configured to track the three-dimensional position of a real object.

14. The system of claim 13, wherein the real-object tracking system is further configured to track the roll, pitch, and yaw of the real object.

15. A method for providing images, comprising:

generating a first image to be viewed from a first distance by an observer;

generating a second image to be viewed from a second distance by the observer;

synchronizing the first image with the second image;

receiving information regarding a position and orientation of a real-object located at least partially between the first distance and the second distance from the observer; and adjusting the first image and the second image as a function of the position and orientation of the real object.

16. The method of claim 15, wherein the first and second images are stereographically polarized images.

17. The method of claim 15, further comprising:

generating a virtual sound field that is a function of at least one of the first and second images;

mapping a location of a probe relative to the first and second images to a location in the virtual sound field; and outputting an audio signal that is a function of the location in the virtual sound field.

18. The method of claim 15, wherein the first and second images are generated such that they are to be projected onto first and second viewing screens, respectively.

19. The method of claim 15, wherein the real object is positioned between the first and second viewing screens.

* * * * *